United States Patent
Pohl

(10) Patent No.: US 12,052,506 B2
(45) Date of Patent: Jul. 30, 2024

(54) METHODS AND APPARATUS USING LONG EXPOSURE VIDEO FOR VIRTUAL REALITY HEADSET

(71) Applicant: Intel Corporation, Santa Clara, CA (US)

(72) Inventor: Daniel Pohl, Saarbrücken (DE)

(73) Assignee: Intel Corporation, Santa Clara, CA (US)

( * ) Notice: Subject to any disclaimer, the term of this patent is extended or adjusted under 35 U.S.C. 154(b) by 346 days.

(21) Appl. No.: 17/161,392

(22) Filed: Jan. 28, 2021

(65) Prior Publication Data

US 2021/0152724 A1 May 20, 2021

Related U.S. Application Data

(63) Continuation of application No. 15/433,298, filed on Feb. 15, 2017, now Pat. No. 10,911,689.

(51) Int. Cl.
| | |
|---|---|
| *H04N 5/235* | (2006.01) |
| *G11B 27/00* | (2006.01) |
| *H04N 5/232* | (2006.01) |
| *H04N 5/77* | (2006.01) |
| *H04N 23/63* | (2023.01) |
| *H04N 23/69* | (2023.01) |
| *H04N 23/698* | (2023.01) |
| *H04N 23/73* | (2023.01) |

(52) U.S. Cl.
CPC ............ *H04N 23/73* (2023.01); *G11B 27/00* (2013.01); *H04N 5/77* (2013.01); *H04N 23/63* (2023.01); *H04N 23/69* (2023.01); *H04N 23/698* (2023.01)

(58) Field of Classification Search
None
See application file for complete search history.

(56) References Cited

U.S. PATENT DOCUMENTS

| | | | |
|---|---|---|---|
| 5,151,812 A * | 9/1992 | Watson | G02B 26/10 348/E3.01 |
| 5,430,807 A * | 7/1995 | Gravely | G02B 21/00 382/128 |
| 6,985,185 B1 | 1/2006 | Crawford et al. | |
| 10,911,689 B2 | 2/2021 | Pohl | |
| 2007/0040928 A1 | 2/2007 | Jung et al. | |
| (Continued) | | | |

OTHER PUBLICATIONS

United States Patent and Trademark Office, "Notice of Allowance" issued in connection with U.S. Appl. No. 15/433,298, dated Sep. 23, 2020, 9 pages.

(Continued)

*Primary Examiner* — Edemio Navas, Jr.
(74) *Attorney, Agent, or Firm* — HANLEY, FLIGHT & ZIMMERMAN, LLC

(57) ABSTRACT

Methods and apparatus are disclosed for using long exposure video for virtual reality headsets. An example apparatus includes a video camera to capture first, real time video of a scene using a first field of view while operating using a first exposure time, the first exposure time corresponding to a normal exposure time of a human eye; a transformer to transform the first, real time video into a second video corresponding to a second exposure time, the second exposure time being at least twice as long as the first exposure time; and a display to display the second video at the second exposure time.

23 Claims, 8 Drawing Sheets

(56) References Cited

U.S. PATENT DOCUMENTS

| | | | |
|---|---|---|---|
| 2008/0211941 A1* | 9/2008 | Deever | H04N 23/73 |
| | | | 348/E5.037 |
| 2009/0295959 A1* | 12/2009 | Shoho | H04N 25/75 |
| | | | 348/294 |
| 2010/0245584 A1 | 9/2010 | Minasyan et al. | |
| 2011/0096179 A1* | 4/2011 | Border | H04N 23/54 |
| | | | 348/208.4 |
| 2012/0038793 A1* | 2/2012 | Shimizu | H04N 23/68 |
| | | | 382/233 |
| 2012/0062732 A1 | 3/2012 | Marman et al. | |
| 2015/0058450 A1 | 2/2015 | Hahm et al. | |
| 2015/0109337 A1 | 4/2015 | Hofmann et al. | |
| 2015/0312468 A1 | 10/2015 | Taylor et al. | |
| 2016/0323560 A1 | 11/2016 | Jin et al. | |
| 2017/0184846 A1* | 6/2017 | Lu | G02B 27/017 |
| 2018/0035101 A1* | 2/2018 | Osterhout | G02B 27/0172 |
| 2018/0098050 A1 | 4/2018 | Oshrat et al. | |
| 2018/0176483 A1* | 6/2018 | Knorr | H04N 5/2723 |

OTHER PUBLICATIONS

United States Patent and Trademark Office, "Final Office Action" issued in connection with U.S. Appl. No. 15/433,298, dated Oct. 3, 2019, 18 pages.

United States Patent and Trademark Office, "Non-Final Office Action" issued in connection with U.S. Appl. No. 15/433,298, dated Jan. 11, 2019, 17 pages.

United States Patent and Trademark Office, "Non-Final Office Action" issued in connection with U.S. Appl. No. 15/433,298, dated Mar. 6, 2020, 17 pages.

* cited by examiner

Drone 106
- Illuminator 108

Video Camera 110a
- Exposure Generator 116a
  - X Selector 122a
  - Exposure Time 120a
  - Long Exposure Time 118a
- Exposure Controller 124a
- Wide Field of View Captured Video 132a
  - Video Frame 130a
- Long Exposure Wide Field of View Captured Video 128a
  - Long Exposure Video Frame 126a Gimbal 114

Head Mounted Display 104a
- Recorder/Player 140
  - Synchronizer 152
  - Recording of Head Movement During Video Recording 150
  - Recording of Wide Field of View Captured Long Exposure Video 142
  - Playback of Long Exposure Wide Field of View Captured Video 144
- Head Movement Sensors 146
  - Adjuster 154
- Display Controller 134
  - FOV Selector 136f
  - Field of View Reducer 136
  - Displayed Field of View 138
  - Panning of Displayed Field of View Within Wide Field of View 148

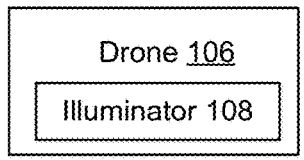

METHODS AND APPARATUS USING LONG EXPOSURE VIDEO FOR VIRTUAL REALITY HEADSET

RELATED APPLICATION

This patent arises from a continuation of U.S. patent application Ser. No. 15/433,298, entitled "METHODS AND APPARATUS USING LONG EXPOSURE VIDEO FOR VIRTUAL REALITY HEADSET," filed on Feb. 15, 2017. Priority to U.S. patent application Ser. No. 15/433,298 is claimed. U.S. patent application Ser. No. 15/433,298 is incorporated herein by reference in its entirety.

FIELD OF THE DISCLOSURE

This disclosure relates to virtual reality headsets, and in particular, to using long exposure video for virtual reality headsets.

BACKGROUND

Virtual reality headsets can provide enhancements to user experiences in new ways. Further, virtual reality headsets can provide for user interaction, as part of those experiences. In particular, head mounted displays can be a convenient way for users to gain access to these new experiences.

BRIEF DESCRIPTION OF THE DRAWINGS

FIG. 1 is a block diagram of an example system using long exposure video and a head mounted display.

FIG. 2 is a block diagram of another example system using long exposure video and a head mounted display.

DETAILED DESCRIPTION

Figure 3:
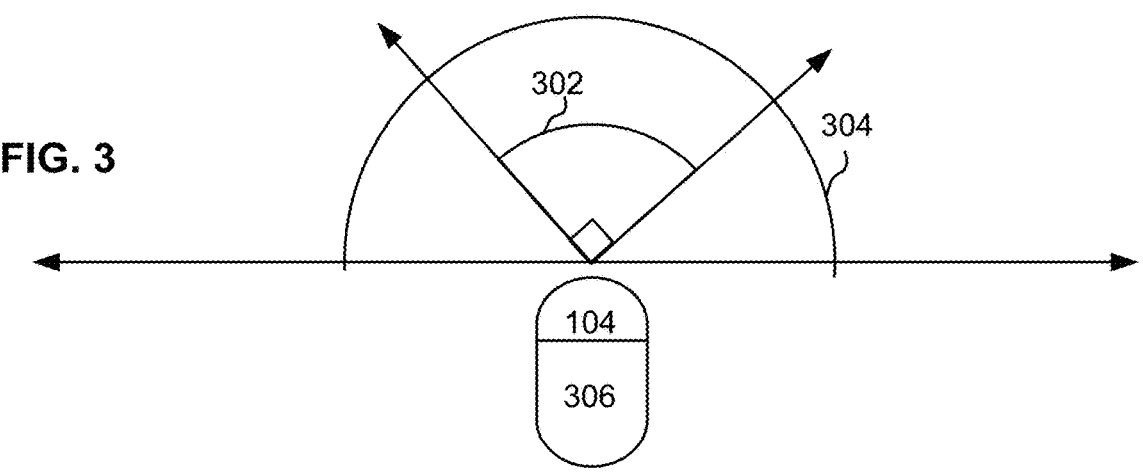
FIGS. 3, 4 and 5 show simplified plan views of the head mounted display rotationally panning a ninety-degree displayed field of view of the scene within a one-hundred-and-eighty-degree wide field of view in playback of long exposure wide field of view captured video based on head movement as determined by sensors during playback.

FIG. 1 is a block diagram of an example video system 100a including an example video apparatus 102a using long exposure video and a head mounted display 104a. As shown in the example of FIG. 1, the video system 100a can include at least one drone 106 having at least one illuminator 108. The example video apparatus 102a can include an example video camera 110a to capture video of an example scene 112, which can include the at least one drone 106 and the at least one illuminator 108. In other examples, the example video camera 110a can capture video of another example scene 112, which can include alternative or additional luminous objects such as fireworks or stars. In combination with many drones and their respective illuminators, spectators can view impressive and amazing scenes, particularly in the night sky. While the scene 112 can be observed by the human eye (e.g., using what is essentially a fixed, normal exposure time of the human eye), even more impressive and more amazing depictions of the scene 112 can be displayed using long exposure video. Long exposure video (e.g., time-exposure video, slow-shutter video, and the like) uses a long-duration exposure time effect that is more than twice as long as normal duration exposure to sharply depict stationary elements of the scene 112 while blurring or smearing depiction of moving elements of the scene. In this way, a long exposure video frame can include blurring or smearing to depict elements of the scene 112 moving over time. In contrast, such blurring or smearing to depict elements of the scene 112 moving over time may not be present in a normal exposure video frame (e.g., may not be present in a video frame having a normal exposure time that is less than half the long exposure time.) Accordingly, the long exposure video frame depicts paths of bright moving objects of the scene 112 so that they are clearly visible in display of the long exposure video frame. In contrast, such paths of bright moving objects of the scene 112 may not be present in the normal exposure video frame (e.g., may not be present in the video frame having the normal exposure time that is less than half the long exposure time.)

As shown in the example of FIG. 1, the head mounted display 104a can be mechanically coupled with the video camera 110a, for example using a gimbal 114. For example, the video camera 110a can be a head mounted video camera 110a and can mounted to the head mounted display 104a via the gimbal to ensure stability in capture of the captured video of the scene 112. The head mounted display 104a can also be communicatively coupled with the video camera 110a to display video of the scene 112 captured by the video camera. The video camera can capture captured video of the scene 112 to display in real time. The head mounted display can be communicatively coupled with the video camera to display the long exposure video corresponding to the captured video in real time.

In the example of FIG. 1, the example video camera 110a can include an exposure generator 116a to generate a long exposure time 118a for at least one long exposure time video frame corresponding to long exposure video of the scene 112 to display. The video camera 110a can have a first operating mode using a first exposure time 120a generated by the exposure generator. The video camera 110a can also have a second operating mode using the long exposure time 118a. The long exposure time 118a of the long exposure time video frame is at least twice as long as the first exposure time 120a. An exposure selector 122a (e.g., X selector 122a) can select between the first operating mode associated with the first exposure time 120a and the second operating mode associated with the long exposure time 118a. An exposure controller 124a can control exposure of the video camera 110a, for example, a first exposure associated with the first exposure time 120a and a long exposure associated with the long exposure time 118a. The exposure generator 116a can be integrally coupled with the exposure controller 124a of the video camera 110a as representatively illustrated in FIG. 1 by the dashed line separation of the exposure generator 116a and the exposure controller 124a in FIG. 1.

The head mounted display 104*a* has a displayed field of view of the scene 112, for example a ninety degree field of view of the scene 112. In contrast, the video camera 110*a* can have a wide field of view, for example a one-hundred-and-eighty degree field of view, to capture wide field of view captured video (e.g. wide field of view captured video having the one-hundred-and-eighty degree field of view.) The wide field of view of the video camera 110*a*, for example the one-hundred-and-eighty degree field of view of the video camera 110*a*, and its wide field of view captured video (e.g. wide field of view captured video having the one-hundred-and-eighty degree field of view) can be wider than the displayed field of view of the head mounted display 104*a*, for example, wider than the ninety degree field of view of the head mounted display 104*a*.

For example, the video camera 110*a* can include the exposure generator 116*a* to generate the long exposure time 118*a* for at least one long exposure time video frame 126*a* corresponding to long exposure captured video 128*a* of the scene 112 (e.g., long exposure wide field of view captured video 128.) Further, the exposure generator 116*a* can also generate the first exposure time 120*a* for at least one video frame 130*a* corresponding to captured video 132*a* associated with the first exposure time 120*a* (e.g., wide field of view captured video 132*a* associated with the first exposure time 120*a*.) For example, the exposure selector 122*a* (e.g., X selector 122*a*) of the video camera 110*a* can select between: (1) the first operating mode to capture the captured video 132*a* associated with the first exposure time 120*a* (e.g., wide field of view captured video 132*a* associated with the first exposure time 120*a*.) and (2) the second operating mode to capture the long exposure captured video 128*a* associated with the long exposure time 118*a* (e.g., long exposure wide field of view captured video 128*a* associated with the long exposure time 118*a*.)

As shown in the example of FIG. 1, the head mounted display 104*a* can include a display controller 134. The display controller 134 can include a field of view reducer 136. The field of view reducer 136 can reduce the wide field of view of the captured video in real time (e.g. reduce the long exposure wide field of view captured video 128*a* in real time) to display the displayed field of view 138 of the scene 112 in real time. The field of view reducer 136 can include a field of view selector 136*f* (e.g., FOV selector 136*f*) to select an amount of reduction of the wide field of view of the captured video in real time (e.g. to select an amount of reduction of the long exposure wide field of view captured video 128*a* in real time) to display the displayed field of view 138 of the scene 112 in real time.

For example, as just discussed, the field of view selected by the field of view selector 136*f* (e.g. FOV selector 136*f*) for the displayed field of view of the scene 112 of the head mounted display 104*a*, can be for example a ninety degree field of view of the scene 112. As just discussed, the wide field of view of the long exposure wide field of view captured video 128*a* (e.g., the one-hundred-and-eighty degree field of view of the long exposure wide field of view captured video 128*a*) can be wider than the displayed field of view of the head mounted display 104*a*, for example, wider than the ninety degree field of view of the head mounted display 104*a* selected by the field of view selector 136*f* (e.g. FOV selector 136*f*). Accordingly, the wide field of view of the long exposure wide field of view captured video 128*a* (e.g., the one-hundred-and-eighty degree field of view of the long exposure wide field of view captured video 128*a*) can be reduced in real time by the field of view reducer 136, to display in real time the displayed field of view 138 of the head mounted display 104*a*, for example, to display in real time the example ninety degree displayed field of view 138 of the head mounted display 104*a*.

Although in the foregoing example, the field of view selected by the field of view selector 136*f* (e.g. FOV selector 136*f*) for the displayed field of view of the scene 112 of the head mounted display 104*a* is the example ninety degree field of view of the scene 112, in response to differing selections (e.g., a first alternative example one-hundred-and-ten degree field of view selection, which is greater than the ninety degree selection, or a second alternative example fifty degree field of view selection, which is less than the ninety degree selection) of the field of view selector 136*f* (e.g. FOV selector 136*f*), the field of reducer 136 can reduce by corresponding differing amounts the wide field of view of the long exposure wide field of view captured video 128*a* (e.g., reduce the one-hundred-and-eighty degree field of view of the long exposure wide field of view captured video 128*a* by corresponding differing amounts to display the first or second alternative example fields of view). For example, the field of view selected by the field of view selector 136*f* (e.g. FOV selector 136*f*) for the displayed field of view of the scene 112 of the head mounted display 104*a* can be the first alternative example one-hundred-and-ten degree field of view or the second alternative example fifty degree field of view of the scene 112. For example, in response to the first alternative example one-hundred-and-ten degree field of view selection or to the second alternative example fifty degree field of view selection of the field of view selector 136*f* (e.g. FOV selector 136*f*), the field of reducer 136 can reduce by corresponding differing amounts the wide field of view of the long exposure wide field of view captured video 128*a* (e.g., reduce the one-hundred-and-eighty degree field of view of the long exposure wide field of view captured video 128*a*) to be the first alternative example one-hundred-and-ten degree field of view or the second alternative example fifty degree field of the displayed field of view of the scene 112 on the head mounted display 104*a*.

As shown in the example of FIG. 1, the head mounted display 104*a* can include a recorder and player 140. As shown in the example of FIG. 1, the recorder and player 140 can be communicatively coupled with the video camera 110*a* to record a recording of the captured video 142 (e.g. record a recording of wide field of view captured long exposure video 142.) The recorder and player 140 can playback the recording of the captured video 144 (e.g., playback the recording of wide field of view captured long exposure video 144.)

In accordance with the wide field of view of the long exposure wide field of view captured video 128*a* (e.g., the one-hundred-and-eighty degree field of view of the long exposure wide field of view captured video 128*a*), the recording and playback likewise can have such wide field of view. For example, playback of long exposure wide field of view captured video 144 can have the one-hundred-and-eighty degree field of view. The wide field of view of the playback of long exposure wide field of view captured video 144 (e.g., the one-hundred-and-eighty degree field of view) can be wider than the displayed field of view of the head mounted display 104*a*, for example, wider than the ninety degree field of view of the head mounted display 104*a*. Accordingly, the wide field of view of the playback of long exposure wide field of view captured video 144 (e.g., the one-hundred-and-eighty degree field of view) can be reduced in real time by the field of view reducer 136, to display in real time the displayed field of view 138 of the head mounted display 104*a*, for example, to display in real time the example ninety degree displayed field of view 138 of the head mounted display 104a. The field of view reducer 136 can include the field of view selector 136f (e.g., FOV selector 136f) to select an amount of reduction of the wide field of view of the playback the captured video in real time (e.g. to select an amount of reduction of playback of long exposure wide field of view captured video 144) to display the displayed field of view 138 of the scene 112 in real time. By using the field of view reducer 136, the head mounted display 104a can display the playback of long exposure wide field of view captured video 144, even though field of view of the playback of long exposure wide field of view captured video 144 is wider than field of view of the displayed field of view 138 of the head mounted display 104a.

Although in the foregoing example, the field of view selected by the field of view selector 136f (e.g. FOV selector 136f) for the head mounted display 104a of the playback of long exposure wide field of view captured video 144 is the example ninety degree field of view of the scene 112, in response to differing selections (e.g., a first alternative example one-hundred-and-ten degree field of view selection, which is greater than the ninety degree selection, or a second alternative example fifty degree field of view selection, which is less than the ninety degree selection) of the field of view selector 136f (e.g. FOV selector 136f), the field of reducer 136 can reduce by corresponding differing amounts the wide field of view of the playback of long exposure wide field of view captured video 144 (e.g., reduce the one-hundred-and-eighty degree field of view of the playback of long exposure wide field of view captured video 144 by corresponding differing amounts to display the first or second alternative example fields of view). For example, the field of view selected by the field of view selector 136f (e.g. FOV selector 136f) for the displayed field of view of the scene 112 of the head mounted display 104a can be the first alternative example one-hundred-and-ten degree field of view or the second alternative example fifty degree field of view of the scene 112. For example, in response to the first alternative example one-hundred-and-ten degree field of view selection or to the second alternative example fifty degree field of view selection of the field of view selector 136f (e.g. FOV selector 136f), the field of reducer 136 can reduce by corresponding differing amounts the wide field of view of playback of long exposure wide field of view captured video 144 (e.g., reduce the one-hundred-and-eighty degree field of view of the playback of long exposure wide field of view captured video 144) to be the first alternative example one-hundred-and-ten degree field of view or the second alternative example fifty degree field of the displayed field of view of the scene 112 on the head mounted display 104a.

In the example shown in FIG. 1, the head mounted display 104a includes sensors to determine head movement including rotational head movement (e.g., head movement sensors 146.) The display controller 134 can include panning of displayed field of view within wide field of view 148 (e.g., panner of displayed field of view within wide field of view 148), so that the head mounted display 104a is to pan rotationally the displayed field of view 138 of the scene 112 within the wide field of view in playback of the recording (e.g. within playback of long exposure wide field of view captured video 144) based on the head movement determined by the sensors (e.g., head movement sensors 146) during playback. For example, as discussed previously herein, playback of long exposure wide field of view captured video 144 can have the one-hundred-and-eighty degree field of view. The display controller 134 can include panning of displayed field of view within wide field of view 148, so that the head mounted display 104a is to pan rotationally the displayed field of view 138 (e.g., the ninety degree displayed field of view of the scene 112) within the one-hundred-and-eighty-degree wide field of view in recording playback of the captured video (e.g. within playback of long exposure wide field of view captured video 144) based on the head movement determined by the sensors (e.g., head movement sensors 146) during playback.

Further, recorder and player 140 as shown for example in FIG. 1 is to record a recording 150 of head movement determined by the sensors (e.g., head movement sensors 146) during recording of the recording of the wide field of view of the captured video 142 (e.g., recording of wide field of view captured long exposure video 142.) Additionally, the recorder and player 140 can include a synchronizer 152. The synchronizer 152 can synchronize the recording 150 of head movement determined by the sensors (e.g., head movement sensors 146) during recording of the recording of the wide field of view of the captured video 142, so that it is synchronized with the recording of the wide field of view of the captured video 142 (e.g., recording of wide field of view captured long exposure video 142.) Additionally, the head mounted display 104a can include an adjuster 154. The display controller 134 including the panning of displayed field of view within wide field of view 148 can be communicatively coupled with head movement sensors 146 and the adjuster 154 to pan rotationally the displayed field of view 138 of the scene 112 within the wide field of view in playback of the recording 144 based on the head movement determined by the sensors 146 during playback and adjusted based on the recording 150 of head movement during the recording of the wide field of view of the captured video 142. For example, the adjuster can 154 use the panning 148 during the playback 144 to compensate for head movement during recording of the wide field of view of the captured video 142. For example, when there is no head movement during playback, the adjuster can 154 use the panning 148 during the playback 144 to remove from display of the playback 144 the head movement recorded 150 during recording of the wide field of view of the captured video 142. As another example, when there is additional head movement during playback, the adjuster can 154 use the panning 148 during the playback 144 to remove from display of the playback 144 the head movement recorded 150 during recording of the wide field of view of the captured video 142, and the panning 148 during the playback 144 displays the panning based on the head movement determined by the sensors (e.g., head movement sensors 146) during playback.

FIG. 2 is a block diagram of another example video system 100a including an example video apparatus 102b using long exposure video and a head mounted display 104b. As shown in the example of FIG. 2, the video system 100b can include at least one drone 106 having at least one illuminator 108. The example video apparatus 102b can include an example video camera 110b to capture video of the example scene 112, which can include the at least one drone 106 and the at least one illuminator 108. In other examples, the example video camera 110b can capture video of another example scene 112, which can include alternative or additional luminous objects such as fireworks or stars.

As shown in the example of FIG. 2, the head mounted display 104b can be mechanically coupled with the video camera 110b, for example using the gimbal 114. For example, the video camera 110b can be the head mounted video camera 110b and can mounted to the head mounted display 104*b* via the gimbal to ensure stability in capture of the captured video of the scene 112. The head mounted display 104*b* can also be communicatively coupled with the video camera 110*b* to display video of the scene 112 captured by the video camera. The video camera can capture captured video of the scene 112 to display in real time. The head mounted display can be communicatively coupled with the video camera to transform the captured video into long exposure video in real time, and to display the transformed long exposure video in real time. An exposure controller 124*b* can control exposure of the video camera 110*b*. The video camera 110*b* has the first operating mode using the first exposure time. However, in the example of FIG. 2 the head mounted display 110*b* can include its own exposure generator 116*b* coupled with an exposure transformer 200 to transform the video camera's 110*b* captured video of the scene 112 into the long exposure video of the scene 112 including the long exposure video frame having the long exposure time. The long exposure time of the long exposure time video frame is at least twice as long as the first exposure time. The exposure transformer 200 can receive the video camera's 110*b* captured video of the scene 112 in real time, and can transform the video camera's 110*b* captured video of the scene 112 into the long exposure video of the scene 112, so that the head mounted display can display the long exposure video of the scene 112 in real time.

In the example of FIG. 2, the example head mounted display 140*b* can include an exposure generator 116*b* to generate a long exposure time 118*b* for at least one long exposure time video frame corresponding to long exposure video of the scene 112 to display. The exposure generator 116*b* of the head mounted display 140*b* can have a first operating mode using a first exposure time 120*b* generated by the exposure generator 116*b*. The exposure generator 116*b* of the head mounted display 140*b* can also have a second operating mode using the long exposure time 118*b*. The long exposure time 118*b* of the long exposure time video frame is at least twice as long as the first exposure time 120*b*. An exposure selector 122*b* (e.g., X selector 122*b*) of the exposure generator 116*b* of the head mounted display 140*b* can select between the first operating mode of the exposure generator 116*b* associated with the first exposure time 120*b* and the second operating mode of the exposure generator 116*b* associated with the long exposure time 118*b*.

The head mounted display 104*b* has a displayed field of view of the scene 112, for example a ninety degree field of view of the scene 112. In contrast, the video camera 110*b* can have a wide field of view, for example a one-hundred-and-eighty degree field of view, to capture wide field of view captured video (e.g. wide field of view captured video having the one-hundred-and-eighty degree field of view.) The wide field of view of the video camera 110*b*, for example the one-hundred-and-eighty degree field of view of the video camera 110*b*, and its corresponding wide field of view captured video (e.g. wide field of view captured video having the one-hundred-and-eighty degree field of view) can be wider than the displayed field of view of the head mounted display 104*b*, for example, wider than the ninety degree field of view of the head mounted display 104*b*.

For example, the head mounted display 104*b* can include the exposure generator 116*b* to generate the long exposure time 118*b*. In response to the long exposure time 118*b* selected by the selector 122 and generated by the exposure generator 116*b*, the exposure transformer 200 can transform in real time the wide field of view captured video 132 into the long exposure wide field of view captured video 128*b*, so that the head mounted display 110*b* can display the long exposure wide field of view captured video 128*b* in real time. For example, the exposure transformer 200 can receive the wide field of view captured video 132 from the video camera 110*b* in real time, and can transform the wide field of view captured video 132 in real time into the long exposure wide field of view captured video 128*b*. For example, for respective video frames of the wide field of view captured video 132, the exposure transformer can transform exposure of the respective video frames of the wide field of view captured video 132 into respective video frames of long exposure wide field of view captured video 128*b*, for example, by employing pixel luminance addition of one or more respective adjacent video frames to the respective transformed frame of the wide field of view captured video 132.

For example, the exposure generator 116*b* can generate the first exposure time 120*b* corresponding to at least one video frame 130*b*, which corresponds to captured video 132*b* associated with the first exposure time 120*b* (e.g., wide field of view captured video 132*b* associated with the first exposure time 120*b*.) For example, the exposure selector 122*b* (e.g., X selector 122*b*) of the exposure generator 116*b* can select between: (1) the first operating mode to select the captured video 132*b* associated with the first exposure time 120*b* (e.g., wide field of view captured video 132*b* associated with the first exposure time 120*b*.) and (2) the second operating mode to select the long exposure captured video 128*b* transformed by the exposure transformer 200 and associated with the long exposure time 118*b* (e.g., long exposure wide field of view captured video 128*b* associated with the long exposure time 118*b*.)

As shown in the example of FIG. 2, the head mounted display 104*b* can include the display controller 134. The display controller 134 can include the field of view reducer 136. The field of view reducer 136 can reduce the wide field of view of the captured video in real time (e.g. reduce the long exposure wide field of view captured video 128*b* in real time) to display the displayed field of view 138 of the scene 112 in real time. The field of view reducer 136 can include a field of view selector 136*f* (e.g., FOV selector 136*f*) to select an amount of reduction of the wide field of view of the captured video in real time (e.g. to select an amount of reduction of the long exposure wide field of view captured video 128*a* in real time) to display the displayed field of view 138 of the scene 112 in real time.

For example, as discussed previously herein, the field of view selected by the field of view selector 136*f* (e.g. FOV selector 136*f*) for the displayed field of view of the scene 112 of the head mounted display 104*a*, can be for example a ninety degree field of view of the scene 112. The wide field of view of the long exposure wide field of view captured video 128*b* (e.g., the one-hundred-and-eighty degree field of view of the long exposure wide field of view captured video 128*b*) can be wider than the displayed field of view of the head mounted display 104*b*, for example, wider than the ninety degree field of view of the head mounted display 104*b* selected by the field of view selector 136*f* (e.g. FOV selector 136*f*). Accordingly, the wide field of view of the long exposure wide field of view captured video 128*b* (e.g., the one-hundred-and-eighty degree field of view of the long exposure wide field of view captured video 128*b*) can be reduced in real time by the field of view reducer 136, to display in real time the displayed field of view 138 of the head mounted display 104*b*, for example, to display in real time the example ninety degree displayed field of view 138 of the head mounted display 104*b*.

Although in the foregoing example, the field of view selected by the field of view selector 136*f* (e.g. FOV selector 136*f*) for the displayed field of view of the scene 112 of the head mounted display 104*b* is the example ninety degree field of view of the scene 112, in response to differing selections (e.g., a first alternative example one-hundred-and-ten degree field of view selection, which is greater than the ninety degree selection, or a second alternative example fifty degree field of view selection, which is less than the ninety degree selection) of the field of view selector 136*f* (e.g. FOV selector 136*f*), the field of reducer 136 can reduce by corresponding differing amounts the wide field of view of the long exposure wide field of view captured video 128*b* (e.g., reduce the one-hundred-and-eighty degree field of view of the long exposure wide field of view captured video 128*b* by corresponding differing amounts to display the first or second alternative example fields of view). For example, the field of view selected by the field of view selector 136*f* (e.g. FOV selector 136*f*) for the displayed field of view of the scene 112 of the head mounted display 104*b* can be the first alternative example one-hundred-and-ten degree field of view or the second alternative example fifty degree field of view of the scene 112. For example, in response to the first alternative example one-hundred-and-ten degree field of view selection or to the second alternative example fifty degree field of view selection of the field of view selector 136*f* (e.g. FOV selector 136*f*), the field of reducer 136 can reduce by corresponding differing amounts the wide field of view of the long exposure wide field of view captured video 128*b* (e.g., reduce the one-hundred-and-eighty degree field of view of the long exposure wide field of view captured video 128*b*) to be the first alternative example one-hundred-and-ten degree field of view or the second alternative example fifty degree field of the displayed field of view of the scene 112 on the head mounted display 104*b*.

As shown in the example of FIG. 2, the head mounted display 104*b* can include the recorder and player 140. As shown in the example of FIG. 2, the recorder and player 140 can be communicatively coupled with the exposure transformer to record a recording of the transformed captured video 142 (e.g. record a recording of wide field of view captured long exposure video 142.) The recorder and player 140 can playback the recording of the transformed captured video 144 (e.g., playback the recording of wide field of view captured long exposure video 144.)

In accordance with the wide field of view of the long exposure wide field of view captured video 128*b* (e.g., the one-hundred-and-eighty degree field of view of the long exposure wide field of view captured video 128*b*), the recording and playback likewise can have such wide field of view. For example, playback of long exposure wide field of view captured video 144 can have the one-hundred-and-eighty degree field of view. The wide field of view of the playback of long exposure wide field of view captured video 144 (e.g., the one-hundred-and-eighty degree field of view) can be wider than the displayed field of view of the head mounted display 104*b*, for example, wider than the ninety degree field of view of the head mounted display 104*b*. Accordingly, the wide field of view of the playback of long exposure wide field of view captured video 144 (e.g., the one-hundred-and-eighty degree field of view) can be reduced in real time by the field of view reducer 136, to display in real time the displayed field of view 138 of the head mounted display 104*b*, for example, to display in real time the example ninety degree displayed field of view 138 of the head mounted display 104*b*. The field of view reducer 136 can include the field of view selector 136*f* (e.g., FOV selector 136*f*) to select an amount of reduction of the wide field of view of the playback the captured video in real time (e.g. to select an amount of reduction of playback of long exposure wide field of view captured video 144) to display the displayed field of view 138 of the scene 112 in real time. By using the field of view reducer 136, the head mounted display 104*b* can display the playback of long exposure wide field of view captured video 144, even though field of view of the playback of long exposure wide field of view captured video 144 is wider than field of view of the displayed field of view 138 of the head mounted display 104*b*.

Although in the foregoing example, the field of view selected by the field of view selector 136*f* (e.g. FOV selector 136*f*) for the head mounted display 104*b* of the playback of long exposure wide field of view captured video 144 is the example ninety degree field of view of the scene 112, in response to differing selections (e.g., a first alternative example one-hundred-and-ten degree field of view selection, which is greater than the ninety degree selection, or a second alternative example fifty degree field of view selection, which is less than the ninety degree selection) of the field of view selector 136*f* (e.g. FOV selector 136*f*), the field of reducer 136 can reduce by corresponding differing amounts the wide field of view of the playback of long exposure wide field of view captured video 144 (e.g., reduce the one-hundred-and-eighty degree field of view of the playback of long exposure wide field of view captured video 144 by corresponding differing amounts to display the first or second alternative example fields of view). For example, the field of view selected by the field of view selector 136*f* (e.g. FOV selector 136*f*) for the displayed field of view of the scene 112 of the head mounted display 104*b* can be the first alternative example one-hundred-and-ten degree field of view or the second alternative example fifty degree field of view of the scene 112. For example, in response to the first alternative example one-hundred-and-ten degree field of view selection or to the second alternative example fifty degree field of view selection of the field of view selector 136*f* (e.g. FOV selector 136*f*), the field of reducer 136 can reduce by corresponding differing amounts the wide field of view of playback of long exposure wide field of view captured video 144 (e.g., reduce the one-hundred-and-eighty degree field of view of the playback of long exposure wide field of view captured video 144) to be the first alternative example one-hundred-and-ten degree field of view or the second alternative example fifty degree field of the displayed field of view of the scene 112 on the head mounted display 104*b*.

In the example shown in FIG. 2, the head mounted display 104*b* includes sensors to determine head movement including rotational head movement (e.g., head movement sensors 146.) The display controller 134 can include panning of displayed field of view within wide field of view 148 (e.g., panner of displayed field of view within wide field of view 148), so that the head mounted display 104*b* is to pan rotationally the displayed field of view 138 of the scene 112 within the wide field of view in playback of the recording (e.g. within playback of long exposure wide field of view captured video 144) based on the head movement determined by the sensors (e.g., head movement sensors 146) during playback. For example, as discussed previously herein, playback of long exposure wide field of view captured video 144 can have the one-hundred-and-eighty degree field of view. The display controller 134 can include panning of displayed field of view within wide field of view 148, so that the head mounted display 104*b* is to pan rotationally the displayed field of view 138 (e.g., the ninety degree displayed field of view of the scene 112) within the one-hundred-and-eighty-degree wide field of view in recording playback of the captured video (e.g. within playback of long exposure wide field of view captured video 144) based on the head movement determined by the sensors (e.g., head movement sensors 146) during playback.

Further, recorder and player 140 as shown for example in FIG. 2 is to record a recording 150 of head movement determined by the sensors (e.g., head movement sensors 146) during recording of the recording of the wide field of view of the captured video 142 (e.g., recording of wide field of view captured long exposure video 142.) Additionally, the recorder and player 140 can include a synchronizer 152. The synchronizer 152 can synchronize the recording 150 of head movement determined by the sensors (e.g., head movement sensors 146) during recording of the recording of the wide field of view of the captured video 142, so that it is synchronized with the recording of the wide field of view of the captured video 142 (e.g., recording of wide field of view captured long exposure video 142.) Additionally, the head mounted display 104b can include an adjuster 154. The display controller 134 including the panning of displayed field of view within wide field of view 148 can be communicatively coupled with head movement sensors 146 and the adjuster 154 to pan rotationally the displayed field of view 138 of the scene 112 within the wide field of view in playback of the recording 144 based on the head movement determined by the sensors 146 during playback and adjusted based on the recording 150 of head movement during the recording of the wide field of view of the captured video 142. For example, the adjuster can 154 use the panning 148 during the playback 144 to compensate for head movement during recording of the wide field of view of the captured video 142. For example, when there is no head movement during playback, the adjuster can 154 use the panning 148 during the playback 144 to remove from display of the playback 144 the head movement recorded 150 during recording of the wide field of view of the captured video 142. As another example, when there is additional head movement during playback, the adjuster can 154 use the panning 148 during the playback 144 to remove from display of the playback 144 the head movement recorded 150 during recording of the wide field of view of the captured video 142, and the panning 148 during the playback 144 displays the panning based on the head movement determined by the sensors (e.g., head movement sensors 146) during playback.

Figure 4:
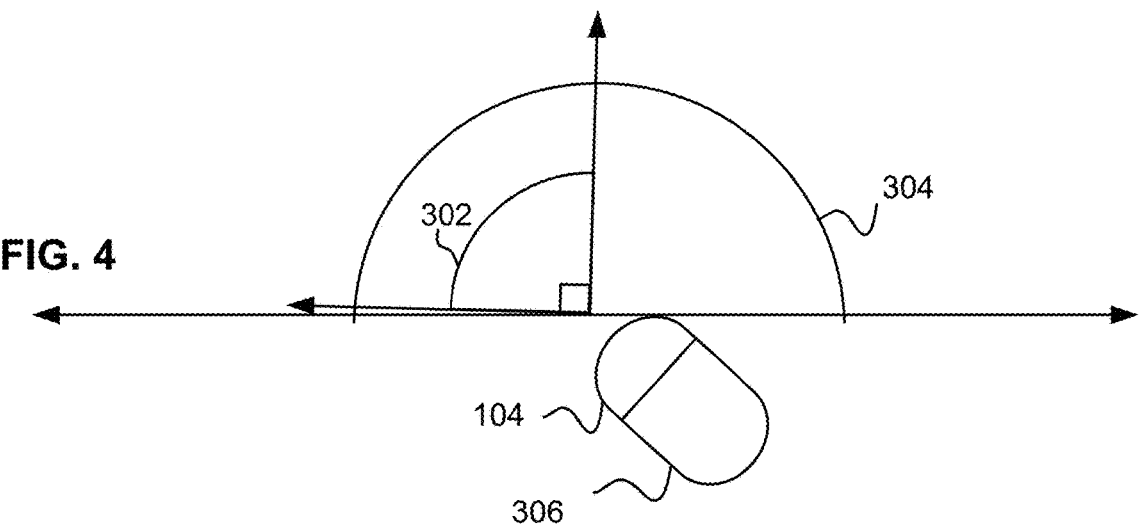
Figure 5:
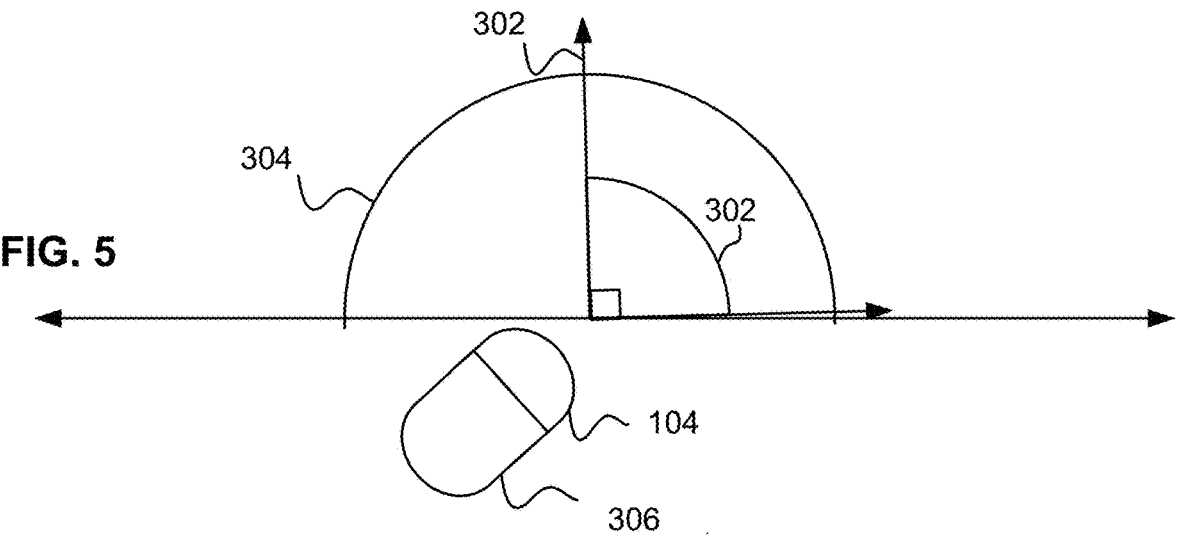

FIGS. 3, 4 and 5 show simplified plan views of the head mounted display 104 (e.g. head mounted display 104a of FIG. 1 or head mounted display 104b of FIG. 2) rotationally panning a ninety-degree displayed field of view 302 of the scene within a one-hundred-and-eighty-degree wide field of view 304 in playback of long exposure wide field of view captured video on head mounted display based on head movement of a head 306 as determined by sensors during playback. For example, FIG. 3 shows a simplified plan view of the head mounted display 104 (e.g. head mounted display 104a of FIG. 1 or head mounted display 104b of FIG. 2) at an initial a ninety-degree displayed field of view 302 of the scene centrally within the one-hundred-and-eighty-degree wide field of view 304 in playback of long exposure wide field of view captured video based on central position of the head 306 as determined by sensors during playback. FIG. 4 is a simplified plan view of the head mounted display 104 (e.g. head mounted display 104a of FIG. 1 or head mounted display 104b of FIG. 2) similar to FIG. 3 but panned rotationally left relative to FIG. 3, so as to illustrate panning the ninety-degree displayed field of view 302 of the scene within the one-hundred-and-eighty-degree wide field of view 304 in playback of long exposure wide field of view captured video based on rotational left head movement of the head 306 as determined by sensors during playback. FIG. 5 is a simplified plan view of the head mounted display 104 (e.g. head mounted display 104a of FIG. 1 or head mounted display 104b of FIG. 2) similar to FIGS. 3 and 4 but panned rotationally right relative to FIGS. 3 and 4, so as to illustrate panning the ninety degree displayed field of view 302 of the scene within the one-hundred-and-eighty-degree wide field of view 304 in playback of long exposure wide field of view captured video based on rotational right head movement of the head 306 as determined by sensors during playback.

Figure 3A:
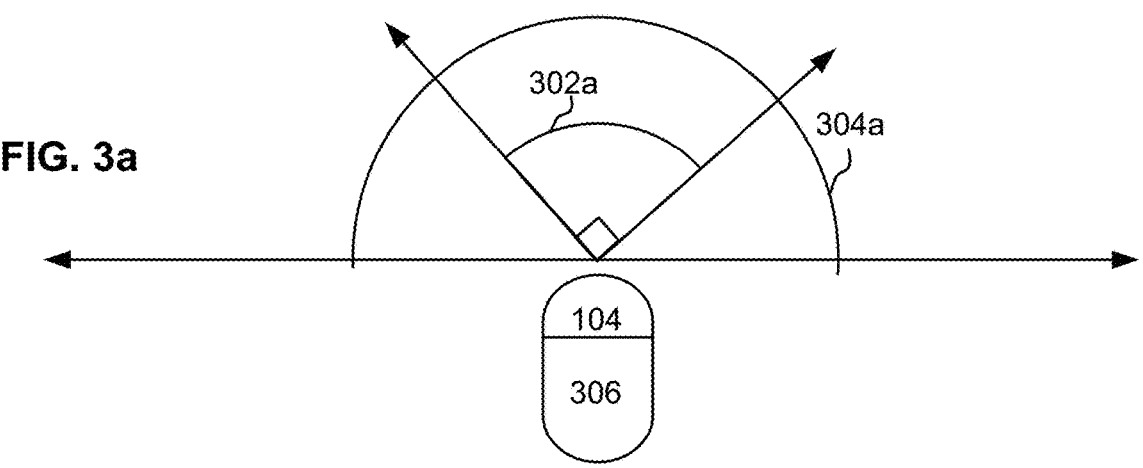
FIGS. 3a, 4a and 5a show simplified plan views of the head mounted display rotating a ninety-degree displayed field of view of the scene within a rotating one-hundred-and-eighty-degree wide field of view of live long exposure wide field of view captured video based on rotating head movement.
Figure 4A:
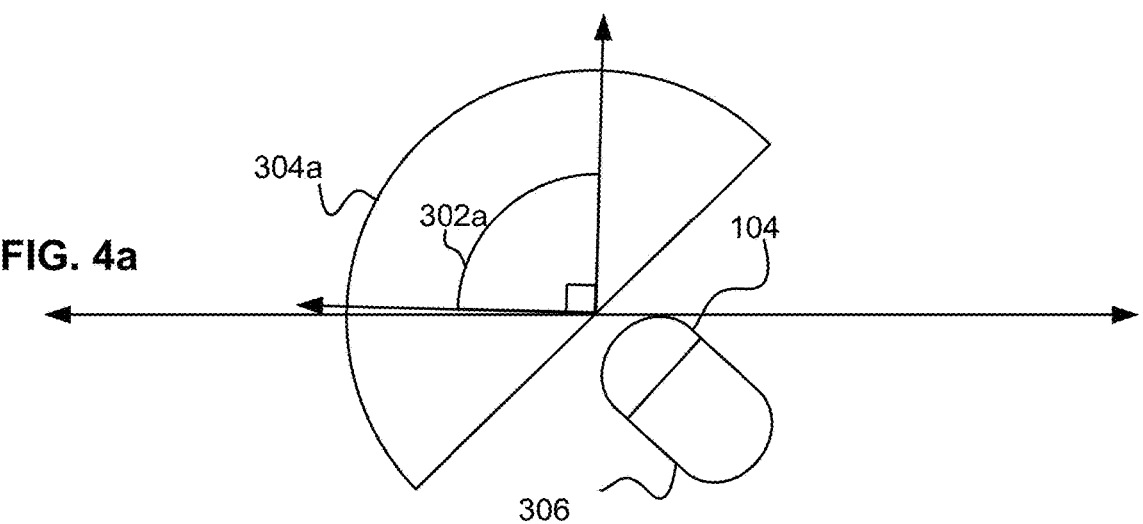
Figure 5A:
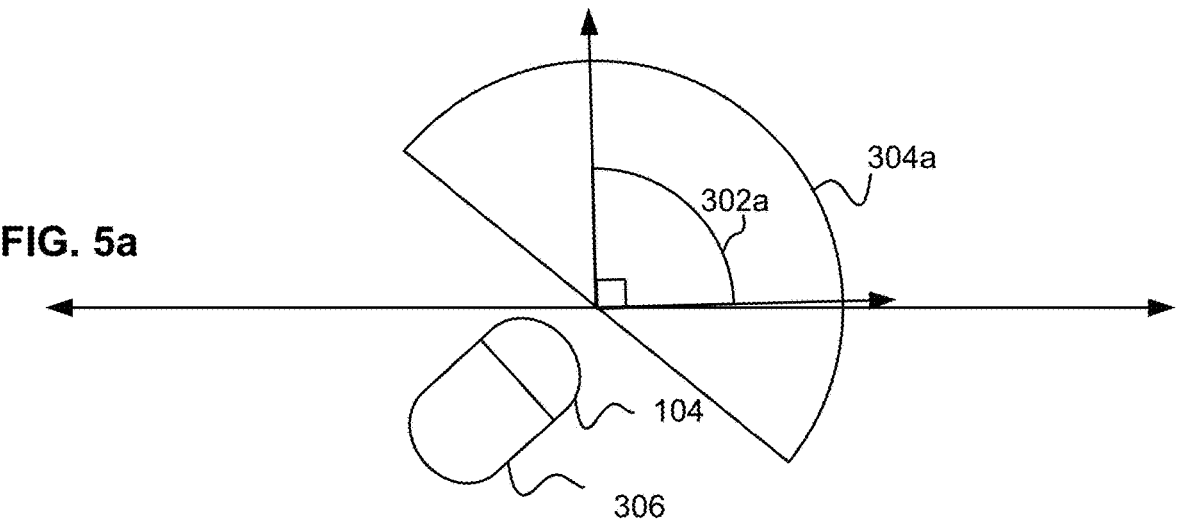

In contrast to the panning and playback of recording as in FIGS. 3, 4, and 5, FIGS. 3a, 4a and 5a instead show live simplified plan views of the head mounted display (e.g. head mounted display 104a of FIG. 1 or head mounted display 104b of FIG. 2) rotating a ninety-degree displayed field of view 302a of the scene within a rotating one-hundred-and-eighty-degree wide field of view 304a of live long exposure wide field of view captured video based on rotating head movement of the head 306. For example, FIG. 3a shows a live simplified plan view of the head mounted display 104 (e.g. head mounted display 104a of FIG. 1 or head mounted display 104b of FIG. 2) at an initial a ninety-degree displayed field of view 302a of the scene centrally within the one-hundred-and-eighty-degree wide field of view 304a of live long exposure wide field of view captured video based on central position of the head 306. FIG. 4a is a live simplified plan view of the head mounted display 104 (e.g. head mounted display 104a of FIG. 1 or head mounted display 104b of FIG. 2) similar to FIG. 3a but rotated left relative to FIG. 3, so as to illustrate left rotation of the ninety-degree displayed field of view 302a of the scene within left rotation of the one-hundred-and-eighty-degree wide field of view 304a of live long exposure wide field of view captured video based on rotational left head movement of the head 306. FIG. 5 is a live simplified plan view of the head mounted display 104 (e.g. head mounted display 104a of FIG. 1 or head mounted display 104b of FIG. 2) similar to FIGS. 3 and 4 but panned rotationally right relative to FIGS. 3 and 4, so as to illustrate right rotation of the ninety degree displayed field of view 302a of the scene within right rotation of the one-hundred-and-eighty-degree wide field of view 304a of live long exposure wide field of view captured video based on rotational right head movement of the head 306.

While example manners of implementing and using the example video systems 100a, 100b for long exposure video and example head mounted displays 104, 104a, 104b of FIGS. 1-5 are illustrated in FIGS. 1-5, one or more of the elements, processes and/or devices illustrated in FIGS. 1-5 may be combined, divided, re-arranged, omitted, eliminated, and/or implemented in any other way. Further, the example video systems 100a, 100b for long exposure video, example video apparatus 102a, 102b, example head mounted displays 104, 104a, 104b, example drone 106, example illuminator 108, example video cameras 110a, 110b, example gimbal 114, example exposure generators 116a, 116b, example long exposure times 118a, 118b, example exposure times 120a, 120b, example exposure selectors 122a, 122b, example exposure controllers 124a, 124b, example long exposure video frames 126a, 126b, example long exposure wide field of view captured video 128a, 128b, example video frames 130a, 130b, example wide field of view captured video 132a, 132b, example display controller 134, example field of view reducer 136, example field of view selector 136f, example displayed field of view 138, example recorder and player 140, example recording of wide field of view captured long exposure video 142, example playback of long exposure wide field of view captured video 144, example head movement sensors 146, example panning of displayed field of view within wide field of view 148, example recording of head movement during video recording 150, example synchronizer 152 and example adjuster 154 may be implemented by hardware, software, firmware and/or any combination of hardware, software and/or firmware.

Thus, for example, any of the example video systems 100a, 100b for long exposure video, example video apparatus 102a, 102b, example head mounted displays 104, 104a, 104b, example drone 106, example illuminator 108, example video cameras 110a, 110b, example gimbal 114, example exposure generators 116a, 116b, example long exposure times 118a, 118b, example exposure times 120a, 120b, example exposure selectors 122a, 122b, example exposure controllers 124a, 124b, example long exposure video frames 126a, 126b, example long exposure wide field of view captured video 128a, 128b, example video frames 130a, 130b, example wide field of view captured video 132a, 132b, example display controller 134, example field of view reducer 136, example displayed field of view 138, example recorder and player 140, example recording of wide field of view captured long exposure video 142, example playback of long exposure wide field of view captured video 144, example head movement sensors 146, example panning of displayed field of view within wide field of view 148, example recording of head movement during video recording 150, example synchronizer 152 and example adjuster 154 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example video systems 100a, 100b for long exposure video, example video apparatus 102a, 102b, example head mounted displays 104, 104a, 104b, example drone 106, example illuminator 108, example video cameras 110a, 110b, example gimbal 114, example exposure generators 116a, 116b, example long exposure times 118a, 118b, example exposure times 120a, 120b, example exposure selectors 122a, 122b, example exposure controllers 124a, 124b, example long exposure video frames 126a, 126b, example long exposure wide field of view captured video 128a, 128b, example video frames 130a, 130b, example wide field of view captured video 132a, 132b, example display controller 134, example field of view reducer 136, example field of view selector 136f, example displayed field of view 138, example recorder and player 140, example recording of wide field of view captured long exposure video 142, example playback of long exposure wide field of view captured video 144, example head movement sensors 146, example panning of displayed field of view within wide field of view 148, example recording of head movement during video recording 150, example synchronizer 152 and example adjuster 154 is/are hereby expressly defined to include a tangible computer readable storage device or storage disk such as a memory, a digital versatile disk (DVD), a compact disk (CD), a Blu-ray disk, etc. storing the software and/or firmware. Further still, example video systems 100a, 100b for long exposure video, example video apparatus 102a, 102b, example head mounted displays 104, 104a, 104b, example drone 106, example illuminator 108, example video cameras 110a, 110b, example gimbal 114, example exposure generators 116a, 116b, example long exposure times 118a, 118b, example exposure times 120a, 120b, example exposure selectors 122a, 122b, example exposure controllers 124a, 124b, example long exposure video frames 126a, 126b, example long exposure wide field of view captured video 128a, 128b, example video frames 130a, 130b, example wide field of view captured video 132a, 132b, example display controller 134, example field of view reducer 136, example field of view selector 136f, example displayed field of view 138, example recorder and player 140, example recording of wide field of view captured long exposure video 142, example playback of long exposure wide field of view captured video 144, example head movement sensors 146, example panning of displayed field of view within wide field of view 148, example recording of head movement during video recording 150, example synchronizer 152 and example adjuster 154 may include more than one of any or all of the illustrated elements, processes and devices.

Figure 6:
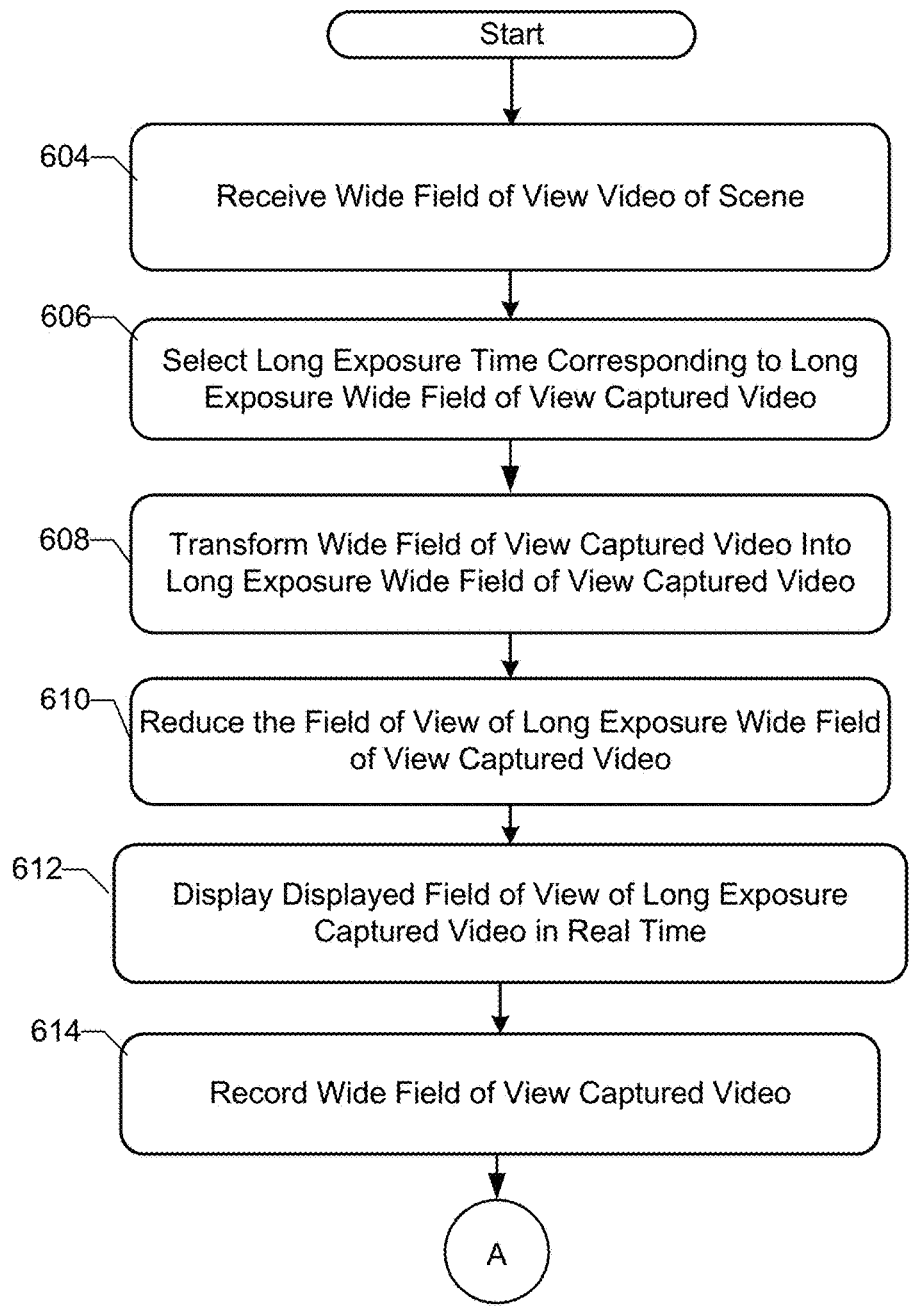
FIGS. 6-8 are a flowchart representative of example of machine readable instructions which may be executed to implement example video capture and example display of long exposure video on the head mounted display of FIGS. 1 and 2.
Figure 7:
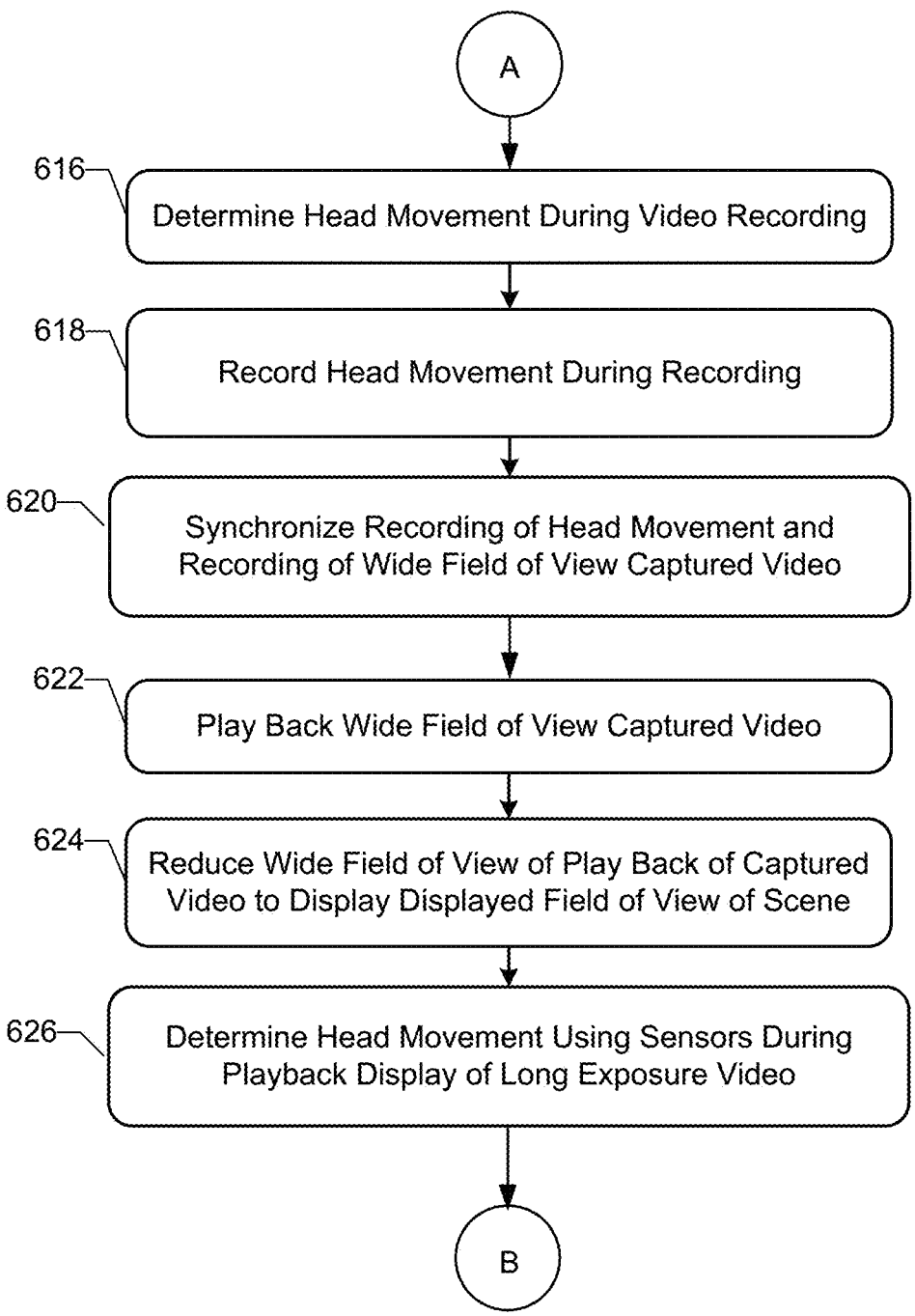
Figure 8:
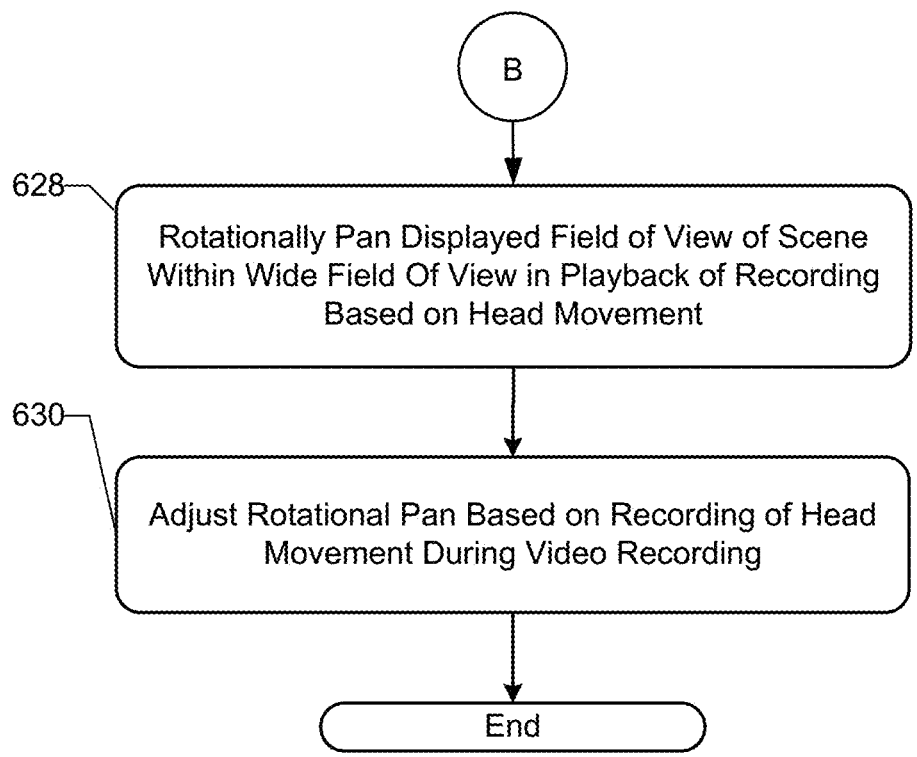

A flowchart representative of example machine readable instructions for implementing the example video capture and example display of long exposure video on the head mounted display is shown in FIGS. 6-8. In this example, the machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIGS. 6-8, many other methods of the example video capture and example display of long exposure video on the head mounted display may alternatively be used. For example, the order of execution of the blocks may be changed, and/or some of the blocks described may be changed, eliminated, or combined.

The video method 600 of FIGS. 6-8 begins at block 604. At block 604, wide field of view video can be received. For example, wide field of view video of a scene can be captured in real time by video camera 110 (e.g., video camera 110a shown in FIG. 1 or video camera 110b shown in FIG. 2). For example, scene 112 shown in FIGS. 1 and 2 can include flight of at least one drone 106. Flight of the at least one drone 106 can be controlled within the scene to display. At least one illuminator 108 of the at least one drone 106 can be activated. The forgoing flight of the drone or drones and the forgoing activation of the illuminator or illuminators can be controlled so that indicia of one or more orthographic symbols appears within the scene. For example, the forgoing flight of the drone or drones and the forgoing activation of the illuminator or illuminators can be controlled so that brands or famous marks can be displayed.

As shown for example in FIG. 6 at block 606, a long exposure time can be selected for at least one long exposure time video frame corresponding to long exposure video of the scene to display. For example, this can be done using the exposure selector 122 (e.g. exposure selector 122a or X selector 122a shown in FIG. 1, or exposure selector 122b or X selector 122b shown in FIG. 2).

As shown for example in FIG. 6 at block 608, the wide field of view captured video of the scene can be transformed in real time into long exposure wide field of view captured video of the scene, including the long exposure video frame having the long exposure time. For example, exposure transformer 200 shown in FIG. 2 can be used.

As shown for example in FIG. 6 at block 610, the field of view of the long exposure wide field of view captured video can be reduced in real time for display, for example, on the head mounted display. For example, this can be done using field of view reducer 134, as shown for example in FIGS. 1 and 2.

As shown for example in FIG. 6 at block 612, the displayed field of view of the scene can be displayed in real time on the head mounted display. For example, as discussed previously herein with reference to FIG. 1, the displayed field of view of the scene 112, can be for example a ninety-degree field of view of the scene 112. The wide field of view of the long exposure wide field of view captured video 128a (e.g., the one-hundred-and-eighty-degree field of view of the long exposure wide field of view captured video 128a) can be wider than the displayed field of view of the head mounted display 104a, for example, wider than the ninety degree field of view of the head mounted display 104a. Accordingly, the wide field of view of the long exposure wide field of view captured video 128a (e.g., the one-hundred-and-eighty degree field of view of the long exposure wide field of view captured video 128a) can be reduced in real time by the field of view reducer 136, to display in real time the displayed field of view 138 of the head mounted display 104a, for example, to display in real time the example ninety degree displayed field of view 138 of the head mounted display 104a.

Further, as shown in the example flowchart of video method 600 in FIG. 6, at block 614 captured video (e.g., long exposure wide field of view captured video) can be recorded. At block 616 in FIG. 7, head movement can be determined using sensors during recording of the captured video (e.g., during recording of the long exposure wide field of view captured video.) At block 618, head movement determined by the sensors during video recording can be recorded. At block 620, the recording of head movement during video recording and the recording of the wide field of view captured video can be synchronized. At block 622, the recording of the captured video (e.g., the recording of the long exposure wide field of view captured video) can be played back.

At block 624, the field of view of playback of the long exposure wide field of view captured video can be reduced in real time for display, for example, on the head mounted display. At block 626, head movement during playback display of the long exposure captured video can be determined using the sensors. At block 628 in FIG. 8, the displayed field of view of the scene can be rotationally panned within the wide field of view in playback of the recording, based on the head movement sensed by the sensors during the video playback. At block 630, the rotationally panning can be adjusted based on the recording of head movement during video recording. After block 630, the video method 600 can end.

As mentioned above, the example processes of FIGS. 6-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 9:
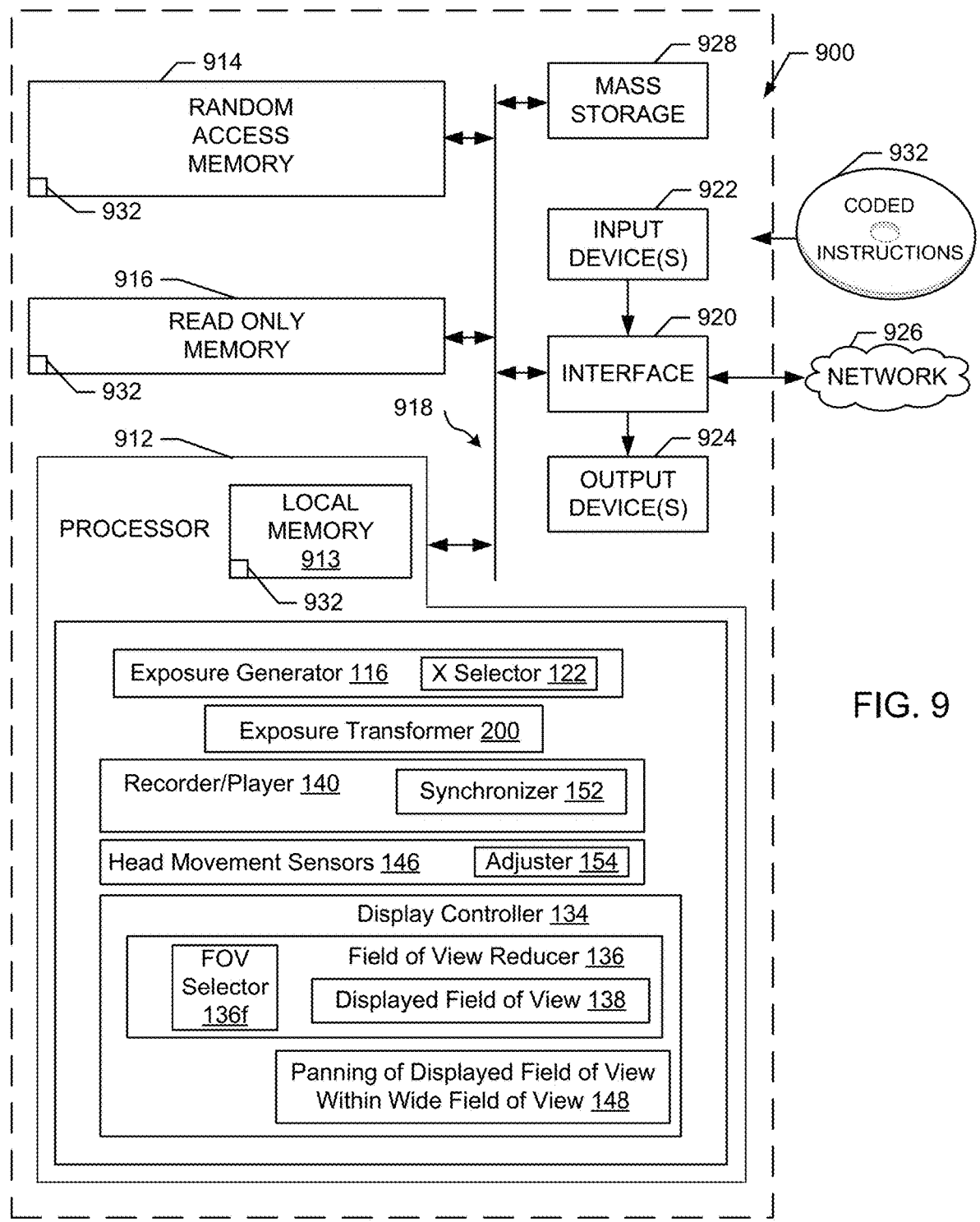
FIG. 9 is a block diagram of an example processing platform capable of executing the example machine-readable instructions of the flowchart of FIGS. 6-8 to implement the example video capture and example display of long exposure video on the head mounted display of FIGS. 1 and 2.

FIG. 9 is a block diagram of an example processing platform capable of executing the example machine-readable instructions of the flowchart of FIGS. 6-8 to implement the example video capture and example display of long exposure video on the head mounted display of FIGS. 1 and 2. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware of processor 912 can be virtualized using virtualization such as Virtual Machines (VM's) and/or containers. The processor 912 can implement aspects of the example video camera and/or head mounted display. For example, the processor 912 can implement: exposure generator 116 (e.g. exposure generator 116a of FIG. 1 or exposure generator 116b of FIG. 2); exposure selector 122 or X selector 122 (e.g. X selector 122a of FIG. 1 or X selector 122b of FIG. 2); display controller 134, field of view reducer 136, field of view selector 136f (e.g., FOV selector 136f), displayed field of view 138, recorder and player 140, head movement sensors 146, the display controller's panning of displayed field of view within wide field view 148, synchronizer 152, adjuster 154 and/or exposure transformer 200.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (e.g. video camera), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., head mounted display, a light emitting diode (LED), an organic light emitting diode (OLED), a liquid crystal display, a cathode ray tube display (CRT), a touch-screen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 6-8 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, systems, apparatus and articles of manufacture provide for using long exposure video and a head mounted display. An example scene, which can benefit from the long exposure video and head mounted display, includes at least one drone and at least one illuminator. Other examples, which can benefit from the long exposure video and head mounted display, include alternative or additional luminous objects such as fireworks or stars. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A video apparatus comprising:
    a video camera to capture first, real time video of a scene using a first field of view while operating using a first exposure time;
    a transformer to transform the first, real time video into a second video corresponding to a second exposure time longer than the first exposure time, the second exposure time being at least twice as long as the first exposure time; and
    a display to display the second video at the second exposure time.

2. The video apparatus as defined in claim 1, further including a field of view reducer to process the first video into the second video after capture of the first video, the second video exhibiting a second field of view different from the first field of view, the first field of view wider than the second field of view.

3. The video apparatus as defined in claim 2, wherein the display has a displayed field of view of the scene, the displayed field of view corresponding to the second field of view.

4. The video apparatus as defined in claim 3, wherein the field of view reducer is to reduce the first field of view of the first video in accordance with the displayed field of view of the display.

5. The video apparatus as defined in claim 4, further including:
    a recorder to record the first video; and
    a player to playback the first video, the field of view reducer to reduce the first field of view of the first video in accordance with the displayed field of view of the display.

6. The video apparatus as defined in claim 5, wherein:
    the display includes sensors to determine head movement; and
    the display is to rotationally pan the displayed field of view relative to the scene of the first video based on the head movement determined by the sensors during playback.

7. The video apparatus as defined in claim 6, wherein:
    the first field of view corresponds to a one-hundred-and-eighty-degree field of view; and
    the second field of view corresponds to a ninety-degree field of view.

8. The video apparatus as defined in claim 7, wherein:
    the video camera is a head mounted video camera;
    the recorder is to record head movement determined by the sensors during recording of the first video, the recording of the head movement synchronized with the recording of the first field of view of the first video; and
    the display is to rotationally pan the second field of view relative to the scene of the first video based on the head movement determined by the sensors during playback and adjusted based on the recording of the head movement during the first video.

9. The video apparatus as defined in claim 1, wherein the display is coupled with the video camera to display the second video in substantially real time with respect to the first, real time video.

10. The video apparatus as defined in claim 1, wherein the video camera is a head mounted video camera mounted via a gimbal to ensure stability during capture of the first video of the scene.

11. A non-transitory machine readable medium comprising instructions that, when executed, cause a machine to at least:
    capture first, real time video of a scene using a first field of view while operating using a first exposure time;
    transform the first, real time video into a second video corresponding to a second exposure time longer than the first exposure time, the second exposure time being at least twice as long as the first exposure time; and display the second video at the second exposure time.

12. The non-transitory machine readable medium as defined in claim 11, wherein the instructions cause the machine to process the first video into the second video after capture of the first video, the second video exhibiting a second field of view different from the first field of view, the first field of wider than the second field of view.

13. The non-transitory machine readable medium as defined in claim 12, wherein the instructions cause the machine to display the second video on an interface, the interface having a displayed field of view of the scene, the displayed field of view corresponding to the second field of view.

14. The non-transitory machine readable medium as defined in claim 13, wherein the instructions cause the machine to reduce the first field of view of the first video in accordance with the displayed field of view of the display.

15. The non-transitory machine readable medium as defined in claim 14, wherein the instructions cause the machine to:

record the first video;

playback the first video; and reduce the first field of view of the first video in accordance with the displayed field of view of the display.

16. The non-transitory machine readable medium as defined in claim 15, wherein the instructions cause the machine to:

determine head movement; and rotationally pan the displayed field of view relative to the scene of the first video based on the head movement determined during playback.

17. The non-transitory machine readable medium as defined in claim 16, wherein:

the first field of view corresponds to a one-hundred-and-eighty-degree field of view; and the second field of view corresponds to a ninety-degree field of view.

18. The non-transitory machine readable medium as defined in claim 17, wherein the instructions cause the machine to:

record head movement determined by sensors during recording of the first video, the recording of the head movement synchronized with the recording of the first field of view of the first video; and rotationally pan the second field of view relative to the scene of the first video based on the head movement determined by the sensors during playback and adjusted based on the recording of the head movement during the first video.

19. The non-transitory machine readable medium as defined in claim 11, wherein the instructions cause the machine to display the second video in substantially real time as the first, real time video is being captured.

20. A video apparatus comprising:

means for capturing first, real time video of a scene using a first field of view while operating using a first exposure time, the first exposure time corresponding to a normal exposure time of a human eye;

means for transforming the first, real time video into a second video corresponding to a second exposure time longer than the first exposure time, the second exposure time being at least twice as long as the first exposure time; and means for displaying the second video at the second exposure time.

21. The video apparatus as defined in claim 20, further including means for processing the first video into the second video after capture of the first video, the second video exhibiting a second field of view different from the first field of view, the first field of view wider than the second field of view.

22. The video apparatus as defined in claim 21, wherein the means for displaying corresponds to a displayed field of view of the scene, the displayed field of view corresponding to the second field of view.

23. The video apparatus as defined in claim 22, wherein the means for processing the first video is to reduce the first field of view of the first video in accordance with the displayed field of view of the means for displaying.

* * * * *